INVENTORS
ROBERT M. JAMISON
EMIL UMBRICHT
BY
Curtis, Morris & Safford
ATTORNEYS

United States Patent Office 3,205,641
Patented Sept. 14, 1965

3,205,641
GAS WASHING WITH LIQUID SPRAY
Robert M. Jamison, Detroit, and Emil Umbricht, Northville, Mich., assignors to Ajem Laboratories, Inc., Livonia, Mich.
Filed May 25, 1961, Ser. No. 112,654
1 Claim. (Cl. 55—230)

This invention relates to the washing of gases with liquid spray droplets forcibly driven across the path of the gas stream through washing apparatus and, more particularly, to such gas washing wherein the spray droplets emanate from a rotating distributor and the gas stream passes downwardly through the spray of droplets and has imparted thereto a swirling or rotational movement as it passes through the liquid spray.

As well understood, gas washing apparatus of the character to which this invention relates is utilized in a wide variety of installations for the removal from streams of air or other gases various solid or liquid or gaseous entrained matter such as paint fumes or paint killing materials, contaminants in exhaust fumes from furnace operations, dust or dirt or fibers carried by forced draft exhaust streams from a variety of industrial operations, etc., with the liquid droplets of washing spray serving to wet the contaminating materials entrained in the gas and to expedite or effect the removal and collection of the entrained materials in the washing liquid or otherwise prior to ultimately exhausting the cleaned gas from the washing apparatus or operation.

Considering the washing of air as illustrative of a situation to which this invention relates, a variety of apparatus, constructions and methods have been developed for such use. Among these may be noted, merely as generally indicative of the area to which this invention relates, those disclosed in such patents as Nos. 2,949,285, 2,940,733, etc. As disclosed in the former, the air to be washed enters the apparatus below the washing liquid spray and passes upwardly through a spray pattern engendered by a rotating cage distributor of spray droplets and then continues tortuously through a baffle chamber for the removal of entrained material. In the latter, the air to be washed enters the apparatus centrally at the top and proceeds downwardly through a spray pattern engendered by a rotating cage distributor and then upwardly through a baffle chamber toward the outlet.

With certain installations or applications, and particularly those where the air or gas to be washed includes gaseous pollutants or extremely fine millimicron particles or droplets, a higher efficiency of washing or finer particle size removal may be desired and yet without substantially or impractically increasing the size of the washing apparatus or requiring additional power for driving the gas to be washed through the washing operation or for spraying the washing liquid.

According to this invention there is provided an arrangement for the washing of gases in the manner described whereby the gas stream is tangentially introduced into the apparatus and passes downwardly through the washing spray therein with a swirling or helical motion prior to proceeding on a tortuous path from the washing liquid spray to be exhausted from the washing operation. As a further feature of this invention, when washing gas having very minute particles therein, the circumferential direction of the swirling movement of the gas stream imparted by tangential introduction thereof into the apparatus is counter to the direction of travel of liquid spray droplets being driven by a rotating cage spray distributor for increasing the force of impact between spray droplets of washing liquid and entrained minute particles in the gas stream to be washed. When washing a gas having gaseous contaminants therein, the circumferential direction of the swirling movement of the gas stream may have the same direction of travel as the liquid spray droplets for increasing the time period of exposure between each spray droplet of the washing liquid and the gaseous contaminants so as to increase the absorption of the contaminating gases into each spray droplet.

With the foregoing and other objects in view, this invention will now be more fully described, and other objects and advantages thereof will be apparent from the following description, the accompanying drawings, and the appended claim.

Figure 1:
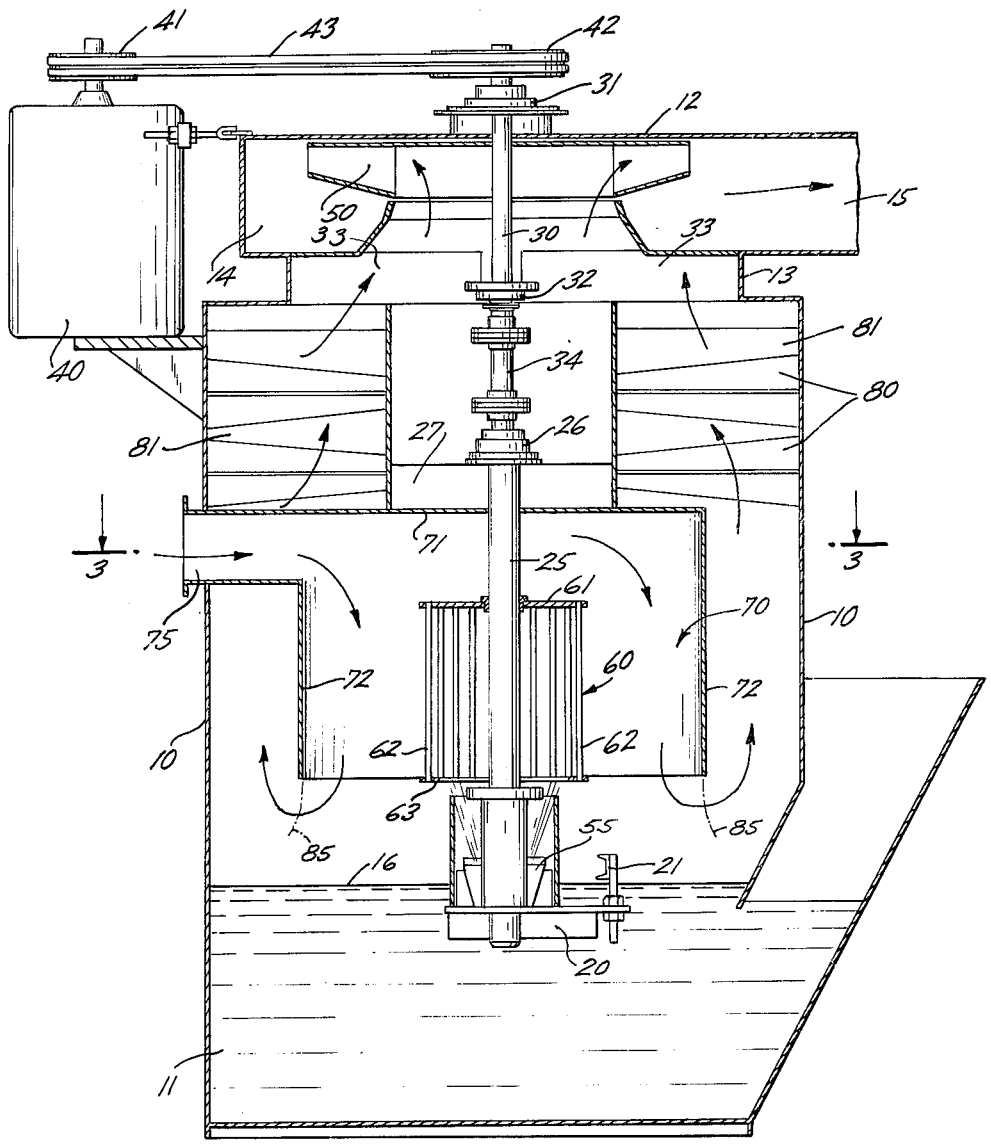
FIG. 1 is a view in vertical section of apparatus embodying and for practising this invention along the line 1—1 of FIG. 2.
Figure 2:
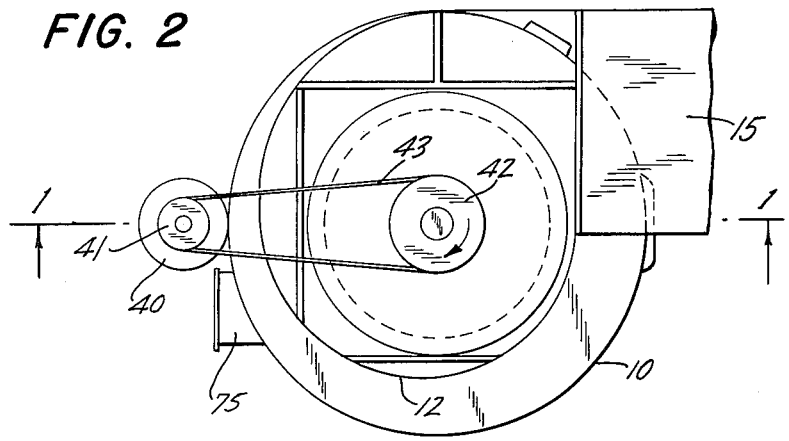
FIG. 2 is a top plan view of the apparatus of FIG. 1.

Referring to the drawings, in which like characters of reference refer to like parts throughout the several views thereof, one form of apparatus embodying and for practising this invention is illustrated as including an outer generally cylindrical casing 10, the lower portion of which forms a tank or reservoir 11 for washing liquid. At the top of casing 10 is mounted a fan housing 12, carried by flange 13 on casing 10 and including outlet duct 14 leading to air outlet 15. Centrally mounted in casing 10 and axially below the normal level 16 of washing liquid in tank portion 11 thereof is a bearing base 20, supported by internal cross brackets 21 in known manner within casing 10, for supporting for rotation the lower end of an axial vertical distributor and impeller shaft 25, the upper end of which is mounted for rotation in bearing 26 supported on internal cross bracket 27.

Vertically mounted through fan housing 12 and above but co-axially aligned with shaft 26 is a shaft 30 serving as the drive shaft and also as the fan shaft supported for rotation in housing 12 as by top bearing 31 carried thereby and lower bearing 32 carried by internal cross brackets 33. The lower end of drive shaft 30 is in driving engagement with the upper end of impeller and distributor shaft 25 as through flexible coupling 34, and shafts 30 and 25 are suitably driven for rotation as by a motor 40 acting through pulley arrangements 41–42 and belts 43. Also mounted on shaft 30 for driving thereby within fan housing 12 is exhaust fan 50 for receiving air from casing 10, after washing therein, and for exhausting it through outlet duct 14 and air outlet 15. At the bottom end of shaft 25 and mounted thereon for rotation therewith is a liquid pumping impeller 55, adapted to pump water or other washing liquid from tank 11 and to force it upwardly into the interior of rotating spray-generating means illustratively shown as a rotating cage distributor 60. This spray-generating means 60 is also mounted on shaft 25 for rotation therewith, and includes a top plate 61 affixed to shaft 25, from which plate depends a plurality of spaced bars or vanes 62, the lower ends of which engage in ring 63.

As will be apparent from the foregoing, as shaft 25 is rotated (from drive motor 40 acting through drive 41–42 and shaft 30) impeller 55 pumps or forces washing liquid from tank 11 up inside rotating cage distributor 60, which washing liquid is flung outwardly as a pattern of spray droplets 64 into the washing space around distributor 60 by the moving vanes 62 of the rotating cage inmpinging upon the stream of washing liquid from impeller 55.

Figure 3:
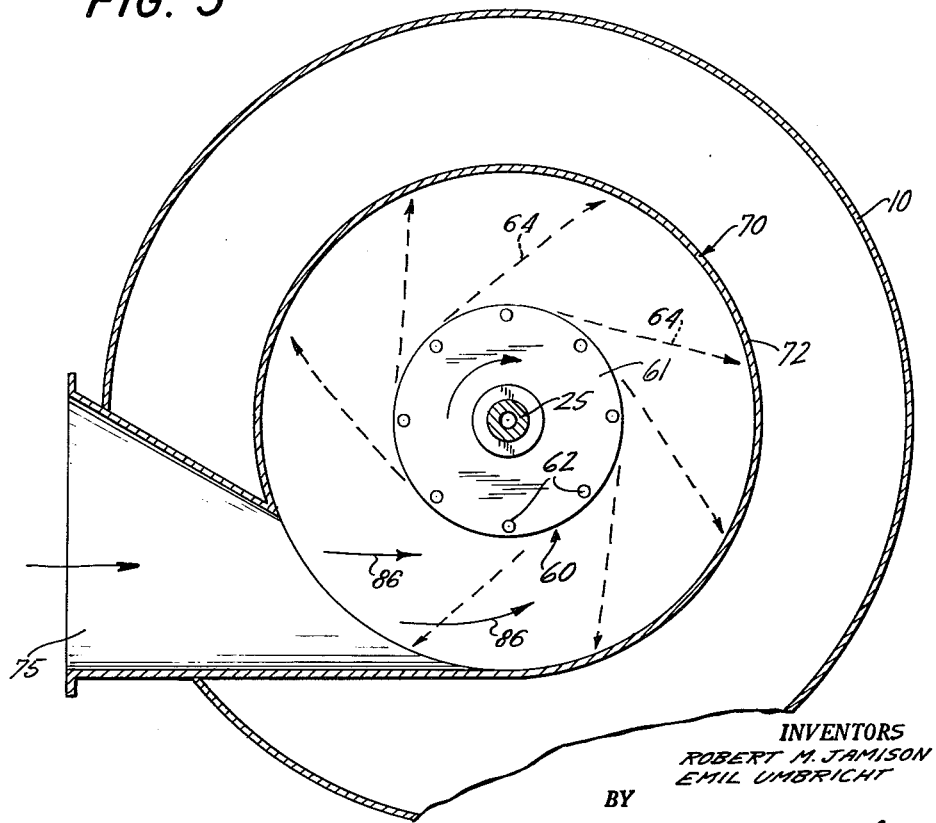
FIG. 3 is a horizontal section along the line 3—3 of FIG. 1.

Also mounted within casing 10, and around rotating distributor cage 60 therein, is a generally cylindrical internal wash chamber 70 having a closed top 71, but being open at the bottom, and having generally cylindrical side walls 72 terminating at a level approximately adjacent the lower end of distributor cage 60 and spaced inwardly from the side walls of casing 10. In the upper portion of wash chamber 70 is provided air inlet 70 and tangentially arranged with respect thereto, as indicated also in FIG. 3, illustrating in more detail a preferred configuration for inlet 75 including the constricting form thereof for high speed tangential entry of the air to be washed into inner wash chamber 70.

Thus, the upper portion of inner wash chamber 70 provided a tangential air inlet path through the inlet duct 75 for introducing air into the apparatus and for imparting to the air stream a swirling motion, while walls 72 of chamber 70 define a washing space for containing the liquid spray droplets 64 flung outwardly by rotating cage distributor 60. The outside of walls 72 define with the outer walls of casing 10 an annular passage around chamber 70 so that air entering tangential inlet 75 will pass downwardly in a swirling pattern through internal wash chamber 70 within walls 72 and through the liquid spray pattern therein, and will then reverse direction, passing under the lower edge of walls 72, and be drawn upwardly outside of the walls 72 through the outer annular passage by the exhaust action of fan 50, substantially as indicated by the various flow arrows in the drawing.

In the upper section of casing 10 and above the air inlet 75 and wash chamber 70, there are provided a plurality of baffle members 80 with spaces 81 therebetween, over and among which the air stream is drawn by fan 50, after leaving the bottom of washing chamber 70, with baffles 80 providing, in known manner, for the removal of entrained moisture or droplets from the washed air. The washing liquid spray flung outwardly by rotating cage distributor 60 ultimately impinges on the inside of walls 72 of chamber 70, forming thereover a substantially continuous sheet or curtain of washing liquid which flows down the inside surfaces of walls 72 to return to reservoir 11.

Preferably the speed and pumping capacity of impeller 55 are so correlated that sufficient washing liquid from reservoir 11 is constantly urged by impeller 55 up into distributor cage 60 to maintain such substantially continuous liquid layer or curtain on the inside of wall 72, and particularly, so that the washing liquid drains off the bottom edge of walls 72 in a substantially continuous annular curtain or screen of liquid (indicated by dot-dash lines 85). The air must pass through this curtain or screen 85 upon leaving wash chamber 70 for a final or added washing effect in addition to that obtained while the air traverses the pattern of spray droplets created by distributor cage 60 within wash chamber 70. This downwardly flowing curtain of washing liquid 85 cooperates with the abrupt change of direction of the air stream under the bottom edge of walls 72 to assure substantially complete removal therefrom of entrained material, etc., so that little, if any, of such material is left for entrapment along with moisture or droplets of washing liquid on baffles 80 in the upper part of chamber 10.

The added efficiency of gas washing apparatus in accordance herewith attributable to the tangential inlet of gas to be washed and the swirling passage thereof down through the wash liquid spray pattern in wash chamber 70 is even further enhanced, particularly for the removal of very minute particles of micron and sub-micron size, if tangential inlet 75 is arranged (as indicated in FIG. 3) to impart to the swirling inlet air a circumferential direction whereby the swirling air movement is opposite to the direction of travel of the washing liquid droplets 64 being flung outwardly by the rotating distributor cage 60. That is, the washing liquid spray 64 is ejected from rotating distributor cage 60 in a direction almost tangential to the periphery of the cage. Accordingly, air inlet 75 may be oriented, as in FIG. 3, in which cage distributor 60 is illustrated as rotating in a clockwise direction, so that the tangentially directed swirling incoming air 86 will be moving in a direction opposite to (e.g., counter-clockwise) the direction of movement of spray droplets 64 in the washing liquid spray. Consequently, there is an increase in the force of impact between spray droplets and entrained particle pollutants in the air to be washed so as to gain the advantage which increased impact force contributes to the wetting, collecting, and removing of entrained matter, and particularly the further increased efficiently in removing very minute particles.

As illustrative of the enhanced efficiently of air washing in accordance herewith, quantatative comparisons have been made between apparatus embodying and for practising this invention and conventional air washing apparatus of the same rated capacity (20,000 c.f.m.), but having neither the tangential air inlet nor air entering above the liquid spray pattern. It has been found that the amount of test pigment purposely entrained and dispersed in the air to be washed (which pigment was standard ASP 100 pigment) still remaining in air issuing from outlet 15 after treatment in accordance herewith was less than ⅓ the amount of pigment which was allowed to pass unwashed and unremoved from the air treated by the conventional washer.

Also, as illustrative of the enhanced efficiency for removing very minute particles with treatment in accordance herewith when the tangential air inlet 75 is oriented with respect to the rotation of cage 60 so that the entering air is swirling in a direction opposite to the direction of movement of the spray pattern (instead of in the same circumferential direction), comparative determinations were also made using dispersed particulate matter, all of which was less than 4 microns in size and approximately 45% of which was less than ½ micron in size. This comparative test was made in order to test the relative efficiencies particularly for removing extremely finely divided contaminants. With an arrangement in which the directions of rotation of the entering air and the water spray pattern were not opposing each other, entering air containing 2110 grains of test pigment per 1000 standard cubic feet was cleaned to an extent where air emerging from the outlet of the apparatus contained only 28.1 grains per 1000 cubic feet, while an inlet loading of 1425 grains per 1000 standard cubic feet resulted in an outlet loading of 24.3 grains per standard cubic feet.

By contrast, determinations on apparatus in which the arrangement of air inlet 75 and the direction of rotation of cage 60 was as indicated on FIG. 3 so that the horizontal movement of wash liquid spray droplets 64 was in a direction toward the horizontal swirling movement 86 of incoming air (and with other conditions such as speed and rotation of motor 40, etc., remaining the same). Air entering inlet 75 and loaded with 2680 grains of test pigment per 1000 cubic feet was cleaned to such an extent that only 13.3 grains of pigment per 1000 cubic feet were still entrained in the air emerging from outlet 15. Similarly, with the preferred counter-directional arrangement, inlet loadings of 1365 grains per 1000 standard cubic feet and 1024 grains per 1000 standard cubic feet both resulted in such highly efficient cleaning that only about 11.4 grains per 1000 standard cubic feet were noted at outlet 15. As will be understood, the amounts of entrained material represented by the foregoing quantitative determination was substantially higher than would be expected in commercial operation, but were intentionally selected to emphasize the enhanced efficiency of the arrangement in accordance herewith effecting counter-directional impingement of inlet air with wash liquid spray droplets as the air is also proceeding downwardly through the wash chamber 70, and particularly in the removal of extremely finely divided entrained contaminants.

Thus, there is provided, in accordance with the foregoing, gas washing apparatus of increased efficiency and in which the washing or removing impact force between washing liquid droplets and entrained matter in the stream of gas to be washed is effectively increased and enhanced for greater washing or removing efficiency in terms of the size of the apparatus, the desired throughput of gas volume, the horsepower required for moving both the gas to be washed and the washing liquid spray, and the amount of entrained matter in the stream of gas to be washed, and such enhancement of operating efficiency or ease is accomplished in accordance with this invention without undesirably complicating or enlarging the gas washing apparatus involved.

Moreover, when washing air or other gases 86 having contaminating gas or gaseous materials therein, then the circumferential swirling of the entering gas stream 86 may be arranged to be in the same direction as the pattern of spray droplets 64. This is accomplished by rotating the spray-generating means 60 in the opposite direction from that as shown in FIGURE 3. In this process for removing contaminating gas or gaseous materials, the rapid rotation of the spray-generating means 60 produces a dense spray pattern, and by virtue of the fact that the air and the contaminating gaseous material therein may be arranged to be travelling in the same direction as the spray droplets, the time period of exposure between each droplet and the contaminating gas is increased. Consequently, a greater absorption of the contaminating gas is provided as desired. It will be appreciated that for gas absorption, the washing liquid, for example such as water, may include reagents and neutralizing agents for helping in the absorption and removal of the contaminating gases.

In this specification there is shown and described a preferred embodiment of this invention and various modifications thereof; but it is to be understood that these are not intended to be exhaustive or limiting of the invention but, on the contrary, are given for purposes of illustration in order that others skilled in the art may fully understand the invention and the principles thereof and the manner of applying it in practical use so that they may modify and adapt it in various forms, each as may be best suited to the conditions of a particular use.

We claim:

Gas washing apparatus of the character described for washing and removing entrained matter from a stream of gas to be washed by subjecting said stream of gas and said entrained matter therein to the action of a rotating spray pattern of washing liquid droplets, comprising in combination an outer casing for said apparatus having a gas outlet in the upper portion thereof, fan means adjacent said outlet for drawing said stream of gas to be washed through said casing for discharge through said outlet, rotating spray distributor means mounted for vertical rotation within said casing in the lower portion thereof and vertically spaced below said outlet, said distributor means including a cage of spaced vertical bars rotatable about a vertical axis for hurling washing liquid impinging thereon outwardly at high velocity to form said rotating spray pattern, means for pumping washing liquid into said cage for impingement against said bars, a generally cylindrical baffle surrounding said rotating spray pattern and spaced from both said spray distributor means and said casing for directing said stream of gas to be washed downwardly through the inside of said baffle and through said spray pattern and then upwardly between the outside of said baffle and said casing toward said outlet, said baffle having a substantially constant circular cross section and a generally flat top closing said baffle above said spray pattern and spaced a substantial distance below said outlet, and an inlet for introducing said stream of gas to be washed into said casing and into said cylindrical baffle at the top thereof and above said rotating spray pattern for downward passage of said gas therethrough, said inlet being tangentially disposed with respect to said cylindrical baffle for imparting a swirling motion to said stream of gas prior to said downward passage thereof through said rotating spray pattern, and oriented with respect to the direction of rotation of said rotating spray pattern for imparting said swirling motion to said stream of gas in a circumferential direction within said baffle opposite to the direction of rotation of said spray pattern effecting increased impact force between said droplets in said rotating spray pattern and said entrained matter in said swirling stream of gas to be washed.

References Cited by the Examiner

UNITED STATES PATENTS

| | | | |
|---|---|---|---|
| 1,952,308 | 3/34 | Bowen. | |
| 2,599,202 | 3/52 | Schimpke | 261—91 |
| 2,889,005 | 6/59 | Umbricht | 55—229 |

HARRY B. THORNTON, *Primary Examiner.*

HERBERT L. MARTIN, *Examiner.*